United States Patent [19]

Park et al.

[11] Patent Number: 5,348,698
[45] Date of Patent: Sep. 20, 1994

[54] METHOD FOR MANUFACTURING PRESSURE CONTAINER HAVING OPPOSITE DOME ENDS WITH DIFFERENT OPENING DIAMETERS

[75] Inventors: Byeong Yeol Park; Sang Ki Chung; Bal Jung, all of Daejon; Keun Choon Jeong; Jong Sik Kim, both of Kyungsangnam, all of Rep. of Korea

[73] Assignee: Agency of Defense Development, Rep. of Korea

[21] Appl. No.: 29,677

[22] Filed: Mar. 11, 1993

[30] Foreign Application Priority Data

Mar. 17, 1992 [KR] Rep. of Korea .............. 4370

[51] Int. Cl.$^5$ .................................. B29C 63/04
[52] U.S. Cl. ...................... 264/154; 264/255; 264/258
[58] Field of Search .................. 264/255, 258, 154

[56] References Cited

U.S. PATENT DOCUMENTS

| | | | |
|---|---|---|---|
| 4,011,254 | 3/1977 | Drostholm | 264/255 |
| 4,677,721 | 7/1987 | Kramer | 264/255 |
| 5,204,033 | 4/1993 | Pearce | 264/255 |

OTHER PUBLICATIONS

G. Lubin, "Handbook of Composites", Van Nostrand Reinhold Co., pp. 458–459 (1982).
S. T. Peters et al., "Filament Winding Composite Structure Fabrication", Society for the Advancement of Material and Process Engineering, pp. 3.4–3.7 (1991).
M. M. Schwartz, "Composite Materials Handbook", McGraw-Hill, Inc., pp. 4.55–4.57 (1984).

*Primary Examiner*—James Derrington
*Attorney, Agent, or Firm*—Scully, Scott, Murphy & Presser

[57] ABSTRACT

A method for manufacturing a pressure container having opposite dome ends with different opening diameters, comprising double-stepped windings involving a primary winding carried out at a small winding angle in a polar winding manner, for forming a primary form on a mandrel provided with bosses having different diameters and a secondary winding carried out at a large winding angle in a helical winding manner, for forming a secondary form on the primary form. The polar winding is carried out under the condition that a metal inserter having a diameter similar to that of the smaller boss is mounted to the larger boss, to be protruded axially outwardly of the larger boss. The helical winding is carried out under the condition that an inserter having a diameter similar to that of the larger boss is mounted to the smaller boss, to be protruded axially outwardly of the smaller boss

1 Claim, 2 Drawing Sheets

PIROR ART

PIROR ART

PIROR ART

FIG. 3.C

METHOD FOR MANUFACTURING PRESSURE CONTAINER HAVING OPPOSITE DOME ENDS WITH DIFFERENT OPENING DIAMETERS

BACKGROUND OF THE INVENTION

1. Field of the Invention

The present invention relates to a method for manufacturing a pressure container used for a high pressure combustion pipe of a rocket propulsion motor and having a cylindrical shape with opposite dome ends, and more particularly to a method for manufacturing a pressure container having opposite dome ends with different opening diameters using polar winding and helical winding processes.

2. Description of the Prior Art

Generally, various high pressure containers and pipes requiring a light weight and a resistance to a high pressure are made of composite materials of resins and fibers of a high strength, such as fiber-reinforced plastic materials. As typical methods for manufacturing pressure containers using such composite materials, there have been known a helical winding process and a polar winding process in which a composite band made by impregnating filaments such as glass fibers or carbon fibers in a thermosetting resin of liquid phase is wound continuously on the surface of a mandrel having a certain shade.

First, the procedure for manufacturing a pressure container using the helical winding process will be described in conjunction with FIGS. 1A and 1B.

As shown in FIGS. 1A and 1B, a mandrel 1 is prepared which has a certain shape having opposite dome ends provided with metal bosses 3 and 4. The metal bosses 3 and 4 have diameters d1 and d2, respectively. In accordance with the helical winding process, a winding band 2 which comprises a plurality of fibers impregnated in a resin material is wound helically on the outer surface of the mandrel at a certain winding angle. Where the diameter of mandrel is D and both the diameters d1 and d2 of bosses 3 and 4 are d, the winding angle α is expressed by the following equation:

$$\alpha = \sin^{-1}\left(\frac{d}{D}\right) \quad (1)$$

At the winding angle based on the equation (1), the winding band 2 is subjected to a tension when it is wound around the mandrel 1. Accordingly, the winding band 2 is maintained at a straight line state between two optional points on the mandrel 1, as shown in FIG. 1B. The winding path of the winding band 2 at opposite dome ends of the mandrel 1 is always maintained tangentially to the peripheries of bosses 3 and 4 so that it extends in perpendicular to the radial direction of bosses 3 and 4.

On the other hand, where the diameter of a pressure container to be manufactured is constant, the winding angle α is increased in proportion to the size of openings at the dome ends of pressure container, as apparent from the equation (1).

In case that the openings formed at opposite dome ends of the pressure container are identical or similar to each other in size, the winding angles at the opposite dome ends are identical to each other, so that the winding band maintains a straight winding path between two optional points thereon. Thus, there is no difficulty in applying the helical winding process for manufacturing the pressure container. Where the diameters of openings at opposite dome ends of the pressure container are different from each other, however, the following problems occur.

That is, where the openings of opposite dome ends are different from each other in size and when a winding band is wound on a mandrel at a small winding angle with respect to the dome end having the smaller opening, to extend in perpendicular to the radial direction of the boss at the same dome end, the winding band is confined at the boss having the larger diameter, even though the winding path at the dome end having the larger opening tends to be maintained at a small winding angle, in similar to the winding path at the dome end having the smaller opening. Under the condition, a slippage of the winding band is caused by the tension which is applied to the winding band. Such a slippage causes the winding path to extend tangentially with respect to the boss having the larger diameter and thus have a large winding angle.

As a result, winding band turns which have been wound on the mandrel at a low winding angle become slip, so that the winding angles thereof are varied from the small winding angle at the dome end having the smaller opening to the large winding angle at the dome end having the larger opening. Consequently, the winding band path does not form a straight line, but a curved line between two optional points on the surface of mandrel.

On the other hand, when a winding band is wound on a mandrel at a large winding angle with respect to the dome end having the larger opening, to extend in perpendicular to the redial direction of the boss at the same dome end, and if assuming that there is no slippage of the winding band at the opposite boss having the smaller diameter, the winding band path at the dome end having the smaller boss extends in perpendicular to the radial direction of the smaller boss at a position spaced apart from the smaller boss a certain distance. As a result, the boss has a portion on which the winding band is not wound, thereby resulting in poor pressure containers.

If outward slippage of the winding band occurs around the smaller boss, the winding band is departed from the surface of mandrel, thereby causing the helical winding to be impossible. Otherwise, inward slippage of the winding band causes the winding band to come into contact with the outer peripheral surface of the smaller boss. At this time, the winding band is wound along a winding path perpendicular to the radial direction of the smaller boss and at a small winding angle, due to the tension applied to the winding band. As a result, the overall winding angles are varied from the small winding angle at the dome end having the smaller opening to the large winding angle at the dome end having the larger opening. Consequently, the winding band path forms a curved line between two optional points on the surface of mandrel. The curvature of winding band path increases as the difference in diameter between dome end openings of the pressure container to be manufacture increases. When the winding band is not wound along a straight path of the minimum length, but a curved path, the fibers of winding band can not exhibit sufficient effects, thereby causing the pressure resistance characteristic to decrease. As a result, the pressure container itself can not resist to the internal pressure and thereby is broken.

Now, the procedure for manufacturing a pressure container using the polar winding process will be described in conjunction with FIG. 2.

As shown in FIG. 2, a mandrel is prepared which has a certain shape having opposite dome ends provided with metal bosses 3 and 4. The metal bosses 3 and 4 have diameters d1 and d2, respectively. In accordance with the polar winding process, a winding band 2 which comprises a plurality of fibers impregnated in a resin material is wound along straight paths between opposite bosses 3 and 4 on the outer surface of the mandrel 1 at a certain winding angle. Where the length of mandrel is L, the winding angle op is expressed by the following equation:

$$\alpha_p = \tan^{-1}\left(\frac{(d1 + d2)/2}{L}\right) \quad (2)$$

For preventing the slippage of winding band on the surface of mandrel when a tension is applied to the winding band between two optional points in the winding band path based on the polar winding, the winding band path should form a straight line of the minimum length and be perpendicular to the curved surface of mandrel. In this connection, the winding angle capable of preventing the slippage of winding band corresponds to $\alpha$ of the equation (1) at given dome opening sizes.

Where a pressure container having d1 of 88 mm, d2 of 250 mm, D (the diameter of mandrel) of 353 mm and L of 1,000 mm is manufactured using the polar winding process, the winding angle becomes 9.6° according to the equation (2). On the other hand, the winding angles capable of preventing the slippage of winding band at opposite domes are 14.4° and 45.0°, respectively, according to the equation (1). However, 9.6° which is the winding angle for polar winding is considerably different from 45.0° which is the winding angle capable of preventing the slippage of winding band at the larger boss. As a result, when the pressure container shown in FIG. 2 is manufactured using the polar winding process, the winding band slips outwardly at the larger boss, thereby causing the polar winding to be impossible.

Specifically, the fibers tends to be wound at the antislippage angle at the larger boss. This tendency make it impossible to apply the polar winding process for manufacturing the pressure container shown in FIG. 2, since the fibers move outwardly away from the surface of mandrel, due to the considerable angle difference between the anti-slippage winding angle $\alpha$ and the polar winding angle $\alpha_p$, that is, $+35.4°$.

Accordingly, there is a problem in applying either of the helical winding process and the polar winding process for manufacturing a pressure container having opposite dome end openings with considerably different sizes.

SUMMARY OF THE INVENTION

Therefore, an object of the invention is to overcome the difficulties and the drawbacks encountered in manufacturing pressure containers having opposite dome ends with different opening sizes, using either of a helical winding process and a polar winding process.

Another object of the invention is to provide a method for manufacturing a pressure container having opposite dome ends with considerably different opening sizes, capable of preventing slippage of winding bands.

In accordance with the present invention, these object can be accomplished by providing a method for manufacturing a pressure container having opposite dome ends with different opening diameters, comprising the steps of: preparing a mandrel having a shape identical to the shape of an inner surface of the pressure container, the mandrel being provided at its opposite ends with a pair of bosses having different diameters and separably mounted to the opposite ends of the mandrel, respectively; mounting a metal insert to the larger boss, the metal insert being protruded axially outwardly of the larger boss and having a diameter larger than the diameter of the smaller boss and the diameter of the larger boss; winding fibers on the mandrel in a polar winding manner, to form a primary form on the mandrel; removing the metal inserts from the larger boss; mounting a pair of inserters to the bosses, respectively, the inserters having diameters identical to the opening diameters of the opposite dome ends of the pressure container, respectively; and winding fibers on the primary form in a helical winding manner, to form a secondary form on the primary form.

BRIEF DESCRIPTION OF THE DRAWINGS

Other objects and aspects of the invention will become apparent from the following description of the preferred embodiment with reference to the accompanying drawings in which:

FIGS. 1A and 1B are schematic views illustrating a procedure for manufacturing a pressure container according to a conventional helical winding process, wherein FIG. 1A is a sectional view and FIG. 1B is an end view;

DESCRIPTION OF THE PREFERRED EMBODIMENT

Figure 1:
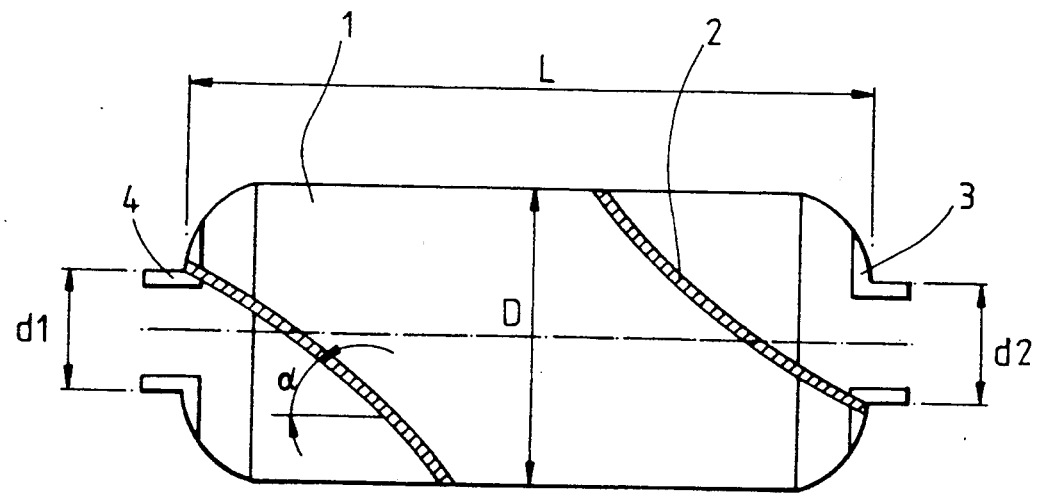
Figure 1:
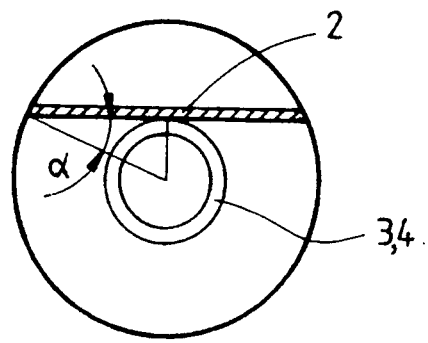
Figure 2:
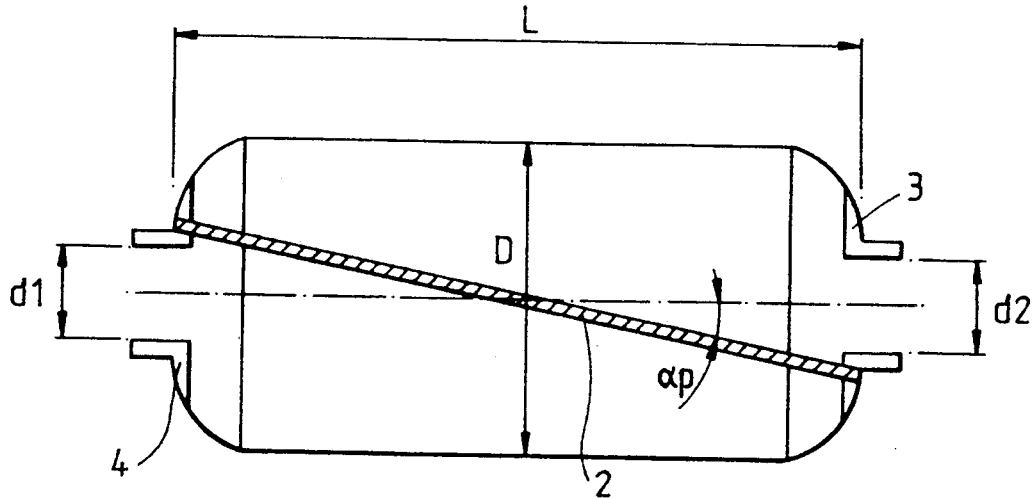
FIG. 2 is a schematic sectional view illustrating a procedure for manufacturing a pressure container according a conventional polar winding process.

The method of the present invention comprises double-stepped windings using metal inserts involving a primary winding carried out at a small winding angle in a polar winding manner, for forming a primary form on a mandrel provided with bosses having different diameters and a secondary winding carried out at a large winding angle in a helical winding manner, for forming a secondary form on the primary form. Prior to the helical winding, the primary form is heated to be set.

In particular, the polar winding for forming the primary form is carried out under the condition that a metal insert having a diameter similar to that of the smaller boss is mounted to the larger boss, to be protruded axially outwardly of the larger boss. With such a small difference between the diameter of the smaller boss and the diameter of the metal insert, the difference between the polar winding angle indicative of a slippage degree of fibers and the winding angle at each dome end is decreased, thereby capable of preventing a slippage of the primarily wound fibers. On the other hand, the helical winding for forming the secondary form is carried out under the condition that an insert having a diameter similar to that of the larger boss is mounted to the smaller boss, to be protruded axially outwardly of the smaller boss. With such a small difference between the diameter of the larger boss and the diameter of the insert, the difference between the helical winding angle and the anti-slippage winding angle is decreased, thereby capable of preventing a slippage of the secondarily wound fibers.

In accordance with the method comprising double-stepped windings using metal inserts according to the present invention, a pressure container having opposite dome ends with different opening diameters can be obtained as follows.

First, a mandrel is prepared which will be fitted around a rotating shaft. The mandrel has a cylindrical shape corresponding to the inner surface of a pressure container to be manufactured. Thereafter, a pair of bosses having different outer diameters are mounted to opposite ends of the mandrel, respectively. In the larger boss, a metal insert is fitted which has an outer diameter similar to the outer diameter of the smaller boss.

Thereafter, fibers are wound around the outer surface of the mandrel in a polar winding manner, while rotating the mandrel together with the rotating shaft, Thereby, a primary form having a predetermined thickness is formed on the mandrel.

The primary form on the mandrel is then heated in an electrical oven so that the resin material of the primary form is set.

Thereafter, a curved end portion of the primary form formed on the larger boss is cut off so that the metal insert can be separated from the larger boss.

After the separation of the metal inserter, a formation of a secondary form is carried out on the primary form. This formation of secondary form is performed in a helical winding manner under the condition that a pair of inserts are mounted to the bosses, respectively. The inserts have outer diameters similar to each other and identical to the larger opening diameter of the opposite dome end of the pressure container to be manufactured, respectively. By the use of inserts, the difference between the opening diameters at opposite dome ends is decreased, so that the difference between the winding angle at each dome end and the anti-slippage winding angle during the helical winding can be decreased.

After the thickness of the secondary form wound on the primary form in the helical winding manner reaches a predetermined value, the secondary form on the primary form was heated in the electrical oven, so as to set its resin material. Subsequently, the inserts are separated from the bosses. Thus, a pressure container is obtained.

As mentioned above, the method of the present invention comprises double-stepped windings involving the primary winding carried out in a polar winding and the secondary winding carried out in a helical winding, which windings use metal insert for decreasing the difference between the opening diameters at opposite dome ends, thereby capable of preventing a slippage of winding fibers due to different winding angles and thus manufacturing pressure containers exhibiting a superior resistance to pressure.

Where a pressure container having opposite dome ends with different opening diameters is to be manufactured and the difference between the opening diameters at the opposite dome ends is large, the difference between the winding angle of fibers and the anti-slippage winding angle based on the equation (2) becomes large, resulting in a slippage of winding fibers. As a result, it is impossible to manufacture a pressure container having a good resistance to pressure. However, the present invention makes it possible to decrease the difference between the opening diameters at the opposite dome ends and thus the difference between the winding angle of fibers and the anti-slippage winding angle, during the windings. Actually, a slight angle difference does not cause any slippage of fibers.

The method of the present invention will be understood more readily with reference to the following example; however this example is intended to illustrate the invention and is not to be construed to limit the scope of the present invention.

EXAMPLE

Figure 3:
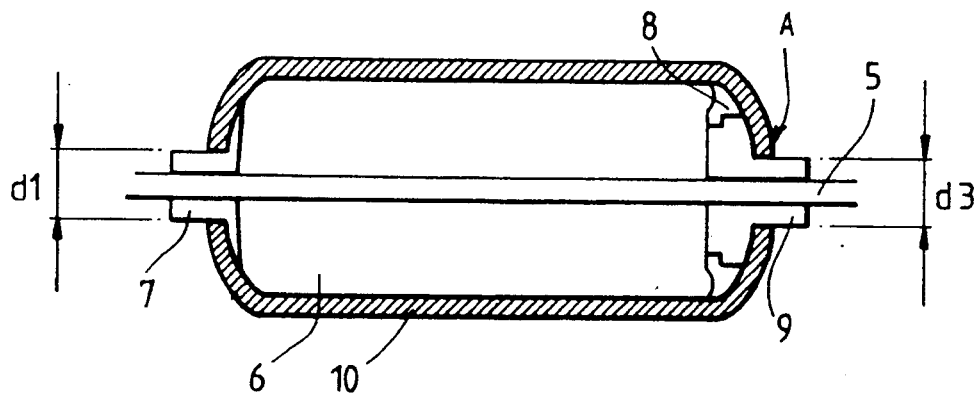
FIG. 3A is a sectional view illustrating a procedure of forming a primary form by using a polar winding process in accordance with the present invention.
FIG. 3B is a sectional view illustrating a procedure of forming a secondary form by using a helical winding process in accordance with the present invention.
FIG. 3C is a sectional view illustrating a complete product in accordance with the present invention.
Figure 3:
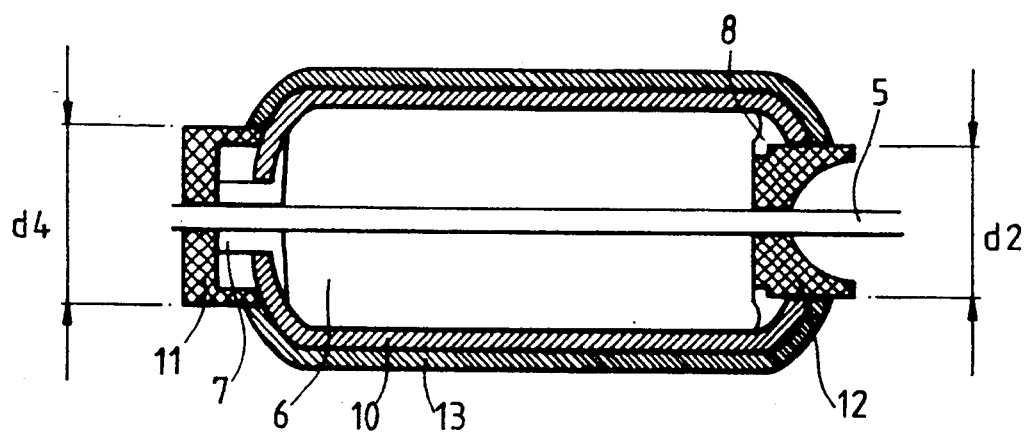
Figure 3:
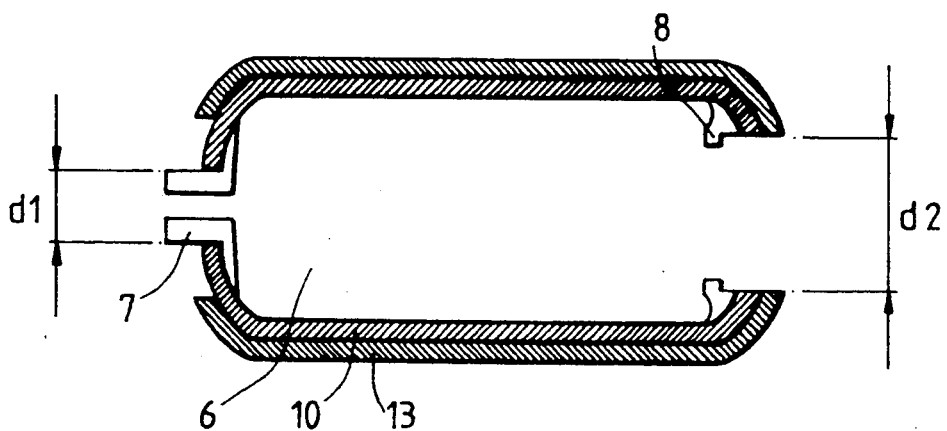

Referring to FIG. 3A to 3C, there is illustrated a procedure of manufacturing a pressure container having opposite dome ends with different opening diameters according to the example. FIG. 3A is a sectional view illustrating a procedure of forming a primary form by using a polar winding process. FIG. 3B is a sectional view illustrating a procedure of forming a secondary form. On the other hand, FIG. 3C is a sectional view illustrating a complete product.

The pressure container to be manufactured in this example had an internal diameter D of 353 mm, an axial length L of 1,000 mm, a smaller opening diameter $d_1$ of 88 mm, and a larger opening diameter $d_2$ of 250 mm.

For manufacturing the pressure container, first, around a rotating shaft 5 was fitted a mandrel 6 having a cylindrical shape corresponding to the inner surface of a pressure container to be manufactured, as shown in FIG. 3A. Thereafter, a smaller boss 7 having a diameter of $d_1$ and a larger boss 8 having a diameter of $d_2$ were mounted to opposite ends of the mandrel 6, respectively. Between the larger boss and the rotating shaft 5 was fitted a metal insert 9 having a diameter $d_3$ larger than the outer diameter $d_1$ of the smaller boss 7, but smaller than the inner diameter $d_2$ of the larger boss 8 ($d_1 < d_3 < d_2$).

Thereafter, a winding band was wound around the outer surface of the mandrel 6 in a polar winding manner, while rotating the mandrel 6 together with the rotating shaft 5. Thereby, a primary form 10 was formed on the mandrel 6.

During the polar winding, the winding band was wound along a straight winding path defined between the smaller boss 7 having the diameter $d_1$ and the metal insert 9 having the diameter $d_3$.

Under the condition, the winding angles for preventing a slippage of fibers at opposite bosses were 14.4° and 21.5° according to the above mentioned equation (1), respectively, whereas the polar winding angle was 6.2° according to the above-mentioned equation (2).

On the other hand, the difference between the anti-slippage winding angle and the polar windings angle, indicative of the slippage degree of fibers on the surface of mandrel 6, was 8.2° at the boss 7 and 15.3° at the metal inserter 9. After carrying out the polar winding, it could be found that any slippage did not occur at the above angle differences.

Accordingly, the winding band was continuously wound on the mandrel 6 in the polar winding manner at the winding angle determined by the equation (2). The polar winding was completed after the thickness of the formed primary form 10 reached a predetermined value, The primary form 10 on the mandrel 6 was heated in an electrical oven so that the resin material of the primary form 10 was set.

Thereafter, a curved end portion A of the primary form 10 formed on the larger boss 8 was cut off to separate the metal insert 9 from the larger boss 8.

Prior to a formation of a secondary form on the primary form 10 after the separation of the metal insert 9, an insert 11 having an outer diameter d4 of 220 mm was mounted to the rotating shaft 5 outwardly of the smaller boss 7, while an inserter 12 having an outer diameter identical to the inner diameter d2 of the larger boss 8 was fitted between the rotating shaft 5 and the larger boss 8, as shown in FIG. 3B. The larger boss 8 had an outer end protruded outwardly of the curved end of the primary form 10.

After mounting the inserters 11 and 12, a helical winding was carried out on the primary form 10 between the inserters 11 and 12, so as to form a secondary form 13 on the primary form 10.

The winding angle for preventing a slippage of fibers during the helical winding was 38.5° at the smaller boss 7 and 45.0° at the larger boss 8, according to the above mentioned equation (1). Although there was a difference between these winding angles, any slippage was not found at this difference of about −6.5°. Accordingly, the helical winding was achieved without occurring no problem.

After the thickness of the secondary form 13 wound on the primary form 10 in the helical winding manner reached a predetermined value, the secondary form 13 on the primary form 10 was heated in the electrical oven, so as to set its resin material. Subsequently, the inserters 11 and 12 were separated from the bosses 7 and 8. Thus, a pressure container shown in FIG. 3C were obtained.

As apparent from the above description, the present invention provides a method for manufacturing a pressure container having opposite dome ends with different opening sizes, comprising double-stepped windings using inserters involving a primary winding carried out in a polar winding and a secondary winding carried out in a helical winding, thereby capable of preventing a slippage of winding fibers due to different winding angles and thus manufacturing pressure containers exhibiting a superior resistance to pressure.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A method for manufacturing a pressure container having a dome end with a first opening diameter and an opposite dome end with a second opening diameter, said second opening diameter larger than said first opening diameter, said method comprising the steps of:

(a) preparing a mandrel having a shape identical to the shape of an inner surface of the pressure container and having opposite ends thereof, said mandrel being provided at each respective opposite end with a first and second boss, said first and second bosses having respective smaller and larger outer diameters such that first boss is mounted to said mandrel end corresponding to said container dome end having said first opening diameter and said second boss is mounted to said opposite mandrel end corresponding to said container dome end having said second opening diameter;

(b) fitting a first metal insert within said second boss, said first metal insert having a portion protruding axially outwardly of said second boss and having an outer diameter equal to or larger than said diameter of said first boss and smaller than said outer diameter of said second boss;

(c) winding a first band of fibers on said mandrel in a polar winding manner to form a primary layer of a first predetermined thickness on said mandrel, said first band of fibers contained in a liquid phase thermosetting resin;

(d) heating said primary layer to thereby thermally set said first band of fibers;

(e) removing an end portion of said primary layer formed on said second boss to enable removal of said first metal insert;

(f) removing said first metal insert from said second boss;

(g) mounting a second insert externally of said first boss and fitting a third insert within said second boss, said second and third inserts each having respective outer diameters substantially similar to said second opening diameter of said dome end of said pressure container, said second insert having a portion protruding axially outwardly of said first boss;

(h) winding a second band of fibers on said primary layer in a helical winding manner to form a secondary layer of a second predetermined thickness on said primary layer, said second band of fibers contained in a liquid phase thermosetting resin;

(i) heating said secondary layer to thereby thermally set said second band of fibers; and, (j) removing said second and third inserts from said respective first and second bosses.

* * * * *